United States Patent
Ruckart et al.

(10) Patent No.: US 7,295,659 B2
(45) Date of Patent: *Nov. 13, 2007

(54) METHOD AND SYSTEM FOR PREPAID COMMUNICATIONS CREDIT

(75) Inventors: John Ruckart, Atlanta, GA (US); Rimas Rauba, Roswell, GA (US); Jerome Wendell Myers, Douglasville, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 212 days.

This patent is subject to a terminal disclaimer.

(21) Appl. No.: 11/183,351

(22) Filed: Jul. 18, 2005

(65) Prior Publication Data

US 2005/0251413 A1    Nov. 10, 2005

Related U.S. Application Data

(63) Continuation of application No. 10/008,888, filed on Nov. 8, 2001, now Pat. No. 6,961,412.

(51) Int. Cl.
*H04M 15/00* (2006.01)
(52) U.S. Cl. .............. 379/114.2; 379/114.15; 379/114.16; 379/144.01
(58) Field of Classification Search ........... 379/144.01, 379/114.15, 114.16, 114.17, 114.19, 114.2, 379/114.24, 114.25, 114.26; 455/405, 406, 455/407, 408
See application file for complete search history.

(56) References Cited

U.S. PATENT DOCUMENTS

| | | | |
|---|---|---|---|
| 4,776,004 A | 10/1988 | Bauer et al. | 379/127.01 |
| 5,409,092 A | 4/1995 | Itako et al. | 194/210 |
| 5,436,957 A | 7/1995 | McConnell | 379/88 |
| 5,719,926 A | 2/1998 | Hill | 379/113 |
| 5,825,863 A | 10/1998 | Walker | 379/114.2 |
| 5,864,604 A | 1/1999 | Moen et al. | 379/114.2 |
| 5,903,633 A | 5/1999 | Lorsch | 379/114.2 |
| 6,026,291 A | 2/2000 | Carlson et al. | 455/406 |
| 6,122,354 A | 9/2000 | Dowens | 379/114.2 |

(Continued)

FOREIGN PATENT DOCUMENTS

DE    198 19 582 A1    11/1999

(Continued)

OTHER PUBLICATIONS

Patent-Pending SmartTouch (SM) Technology Gives Consumers Complete Control Over Long Distance Spending, article at www.currentanalysis.com May 11, 2000.

(Continued)

*Primary Examiner*—Quoc Tran
(74) *Attorney, Agent, or Firm*—Merchant & Gould

(57) ABSTRACT

A method and system for prepaying credits to a user account for communications services provided. If a system detects a predefined condition associated with a communications connection, the system deducts the cost of the communications connection from the credit in the user account. The predefined condition includes the origination of the communications connection from one of a plurality of predefined sources. Software for implementing the method may be implemented in a number of environments, including a computer system accessible remotely or a processor located on the user's telephone.

20 Claims, 6 Drawing Sheets

U.S. PATENT DOCUMENTS

| | | | |
|---|---|---|---|
| 6,188,752 B1 | 2/2001 | Lesley | 379/114.16 |
| 6,195,422 B1 | 2/2001 | Jones et al. | 379/127.05 |
| 6,377,938 B1 | 4/2002 | Block et al. | 705/32 |
| 6,393,275 B1 | 5/2002 | Alfred | 455/422.1 |
| 6,502,745 B1 | 1/2003 | Stimson et al. | 235/375 |
| 6,542,590 B1 | 4/2003 | Player et al. | 379/114.26 |
| 6,546,238 B1 | 4/2003 | Nightingale et al. | 455/406 |
| 6,581,827 B2 | 6/2003 | Welton | 235/380 |
| 6,707,894 B1 | 3/2004 | Halford | 379/114.2 |
| 6,793,135 B1 | 9/2004 | Ryoo | 235/383 |
| 6,950,506 B2* | 9/2005 | Ruckart et al. | 379/114.2 |
| 6,961,412 B2* | 11/2005 | Ruckart et al. | 379/114.2 |
| 2003/0043984 A1 | 3/2003 | Lauzon | 379/144.01 |

FOREIGN PATENT DOCUMENTS

| | | |
|---|---|---|
| EP | 0400911 A2 | 5/1990 |
| EP | 0585004 A2 | 8/1993 |
| GB | 2355134 A | 4/2001 |
| WO | WO93/206644 A1 | 10/1993 |
| WO | WO96/38801 | 5/1996 |
| WO | WO96/41462 | 12/1996 |
| WO | WO98/47112 | 10/1998 |
| WO | WO98/56160 A1 | 12/1998 |
| WO | WO00/77747 A1 | 12/2000 |
| WO | WO02-41619 A1 | 5/2002 |

OTHER PUBLICATIONS

New Bell Atlantic Product Redefines Long Distance, product announcement, Jun. 1, 2000.

USAN Services, webpage printed from www.unsinc.com, Apr. 2, 2001.

Official Action Issue by the Patent Office dated Sep. 30, 2003 related to U.S. Appl. No. 10/088,511.

Official Action Issue by the Patent Office dated Apr. 16, 2004 related to U.S. Appl. No. 10/088,511.

* cited by examiner

METHOD AND SYSTEM FOR PREPAID COMMUNICATIONS CREDIT

CROSS REFERENCE TO RELATED APPLICATIONS

This application is related to application Ser. No. 10/008,511, entitled, "Method and System for Paying Prepaid Communications Credit," which is hereby incorporated by reference, and this application is a continuation of application Ser. No. 10/008,888, entitled "Method and System for Prepaid Communications Credit" filed on Nov. 8, 2001 now U.S. Pat. No. 6,961,412, which is hereby incorporated by reference.

FIELD OF THE INVENTION

The invention relates to a system and method for allowing users to prepay credit for use in a communications network, such as a wired or cellular telephone network.

BACKGROUND

Communications-service providers, such as telephone service providers, employ various methods of charging users for communications usage within a communications network. One method of charging users for communications includes a per-minute rate. For example, if a telephone user makes a long-distance telephone-call, the user is charged a rate per minute multiplied by the number of minutes that the telephone call lasts. One common practice is to change the per-minute rate based on the destination of the telephone call and/or the time of day. For example, telephone calls within a country are typically cheaper per minute than calls from one country to another, and telephone calls during daytime hours, e.g., 9:00 a.m. to 5:00 p.m., are typically more expensive than calls during evening hours, e.g., 5:00 p.m. to 9:00 a.m.

Users who pay for communications services with a per-minute method often have difficulty determining how much money they have spent for communications services until they receive a billing statement from the communications company. In order to keep track of communications costs from day-to-day, the user must know how much time is spent using the communications services and the per-minute rate. It is difficult and inconvenient for users to keep track of how much time is spent using a communications network, and the multiple rates charged by the communications provider are also difficult for users to track. While users often know domestic-telephone per-minute rates, they may not know all international rates for which they would like to make telephone calls without contacting the telephone-service provider. If users are surprised by a large billing-statement, they may become dissatisfied with the communications-services provider and hesitant to use the services without being able to track the costs.

Another conventional method for charging users for communications includes allowing the user to pay a periodic fee for a certain amount of communication usage. This method is particularly common in selling cellular-telephone service. When such a method is employed, a user typically pays a monthly fee for a predefined number of "minutes" of telephone use in a predefined geographic area. If the user uses more than the predefined number of minutes or makes calls outside the predefined geographic area, the user is charged a per-minute rate for the telephone calling time in addition to the monthly fee.

Users who pay for communications services with this certain-amount method also have difficulty determining how much money has been spent on telephone calls or other communications services. In addition, such users often pay for more services than they use in a month. In typical certain-amount plans, if minutes are not used during the month, the minutes cannot be used at a later time. Some users would prefer to pay only for the time that they use.

Some users may have bad credit or non-existent credit and, therefore, would be a credit risk to a communications company charging per minute rates that are due after the communications services are used. Telephone companies often "toll block" these users. In other words, users who are deemed a credit risk are not allowed to make long-distance or other calls requiring a toll or fee.

Many users who are "toll blocked" purchase pre-paid calling cards. Pre-paid service often eliminates the need to demonstrate good credit because the services are paid up front. However, such cards are often inconvenient for users for a number of reasons. Pre-paid calling cards require that a user first dial an access code to access the pre-paid account. The user is often required to first dial a "toll free" phone number to enter the code. Because many cards may be offered by the same communications provider, the codes must differentiate between a large number of users and are often long and cumbersome to dial. In addition, such prepaid calling cards are not associated with an individual, and therefore, cannot be used to create a credit history.

One solution to some of these problems involves allowing users to pre-purchase credits that are used only if a call is made from a predefined telephone line. See U.S. Pat. No. 6,195,422. This method includes adding pre-purchased credits to an account that corresponds to a predefined telephone number. If a call is made from the predefined telephone number, the cost of the telephone call is deducted from the account amount. Users have many of the advantages of pre-paid calling cards, including eliminating a need to demonstrate good credit, without needing to enter lengthy codes.

Still another conventional method for charging users for communications includes "unlimited" communications usage in exchange for a periodic fee. This method is common in selling Internet access. A user typically pays a monthly fee in exchange for unlimited access to a communications network, such as the Internet.

While users who pay for communications services with such a method know exactly how much will be due on a periodic billing statement, users often have the perception that they are paying for communications services that they are not using. While this method of payment may be convenient for users who spend many hours per month connected to the Internet, a user who only uses the Internet for an average of a few minutes per month would probably prefer to pay a per minute rate. However, a per minute rate involves the uncertainties of the fees and rates, and a requirement of a good credit rating discussed above.

Another disadvantage of the current methods of payment exists when several people share the same telephone line, but wish to pay for telephone services individually. This situation is common among roommates. Users in this situation must either purchase calling cards or manually split up the billing statement. If the billing statement is split between individuals, there is no way for the communications service provider to know who incurred which bill, and often one or both individuals will be liable for the entire amount.

Still another disadvantage of the current methods of payment exists when one individual is paying for communications services in two or more households. Such an individual receives separate billing statement for each service, and each billing statement has the disadvantages of the payment method used. In addition, the individual paying for the service may be paying for communications services used by other individuals, such as a common situation where a parent pays for communications services for a child who is living at a separate residence. The individual paying for the service often has no way of restricting the services available to the other individuals, which can be especially problematic if a per minute rate is charged after the services have been provided. A common scenario is a parent being surprised by the phone bill that his or her child has incurred.

These and other problems are avoided and numerous advantages are provided by the methods and systems of the present invention.

SUMMARY OF THE INVENTION

The present invention comprises methods and systems for obtaining and restricting prepaid communications credits. In one embodiment, a system credits a user account with pre-paid credit. If a communications connection originates from at least one of a plurality of predefined sources, then the cost of the communications connection is deducted from the credit in the user account. In this manner, a user pre-pays for communications services that may be used from multiple sources, resulting in simplified billing statements for users who pay for communications services to multiple households or communications lines.

Another embodiment involves two users at the same predefined origination source purchasing pre-paid communications services. An access code is assigned to each user and must be entered before making a toll communications connection. The cost of the communications connection is deducted from the credits associated with the access code that was entered before a communications connection is made. This embodiment allows two users at the same origination source to pre-pay for communications services separately.

For clarity and ease of presentation, reference is made herein to "calls." By a "call" it is meant a communication connection between devices in a communications network. Calls may include wired or wireless telephone calls, or telephone calls made through other communications networks such as Ethernet or cable connections. Any communications connection may be substituted herein for a "call," including any device that connect to a communications network, such as computer "dial-up" Internet connections, e-mail, local area networks ("LAN"), wide area networks ("WAN"). Any communications network may also be substituted, including Ethernet, cable, or digital subscriber lines ("DSL"). Devices that make communications connections include any device that connects to a communications network, such as computers, hand-held devices sold under the trade name Palm™, telephones, cellular phones, and devices for receiving and transmitting e-mail.

In one aspect, a method according to the present invention includes crediting a user's account with pre-paid credit. If a predefined condition associated with a communications connection all is detected, the cost of the communications connection is deducted from the credit in the user account. The predefined condition includes the origination line of the call originating from a plurality of predefined sources. The predefined condition may include the destination number of the communications connection. The predefined condition may also include a determination that the phone call is a long distance communications connection.

In another aspect, a system credits a first user account with a first prepaid credit amount. The first user account includes a first access code. The system credits a second user account with a second prepaid credit amount. The second user account includes a second access code. When a communications connection is made, a code and the origination source of a communications connection is detected. If the origination line of the communications connection is a predefined line and the detected code is the first access code, the system deducts the cost of the communications connection from the first prepaid credit amount. If the origination line of the communications connection is the predefined line, and the detected code is the second access code, the system deducts the cost of the communications connection from the second prepaid credit amount.

In still another aspect of the invention, a computer readable medium includes a first set of instructions for crediting a user account with prepaid credit, a second set of instructions for deducting the cost of a communications connection from the credit in the user account if a predefined condition associated with the communications connection is detected, and the predefined condition includes the origination of the communications connection from a plurality of predefined sources.

In yet another aspect of the invention, a computer readable medium includes a first set of instructions for crediting a first user account with a first prepaid credit amount, and the first user account includes a first access code. The computer readable medium includes a second set of instructions for crediting a second user account with a second prepaid credit amount, and the second user account includes a second access code. The computer readable medium includes a third set of instructions for detecting a code and origination of a communications connection. The computer readable medium includes a fourth set of instruction for deducting the cost of the communications connection from the first prepaid credit amount if the origination line of a communications connection is a predefined source, and a fifth set of instructions for deducting the cost of the communications connection from the second prepaid credit amount if the origination of a call is the predefined source and the code is the second access code.

Embodiments of the present invention offer many advantages. Various embodiments allow a user to pre-purchase credit for payment of communications services. The credit may be used for communications services originating at a plurality of sources, which simplifies payment procedures for individuals paying for communications services at a plurality of sources. Embodiments of the invention also allow the user to place restrictions on how the communications services may be used. For example, a parent may pay for prepaid credits that can be used by a child only to call home. Embodiments of the invention also allow two or more users to prepay credits that can be used from the same origination source.

These and other advantages will become apparent to those of ordinary skill in the art with reference to the detailed description and drawings.

DETAILED DESCRIPTION OF THE INVENTION

According to an embodiment of the present invention, a user account is credited with prepaid credit for communications services. If a predefined condition is detected, the system deducts the cost of a communications connection or other use of communications services from the credit in the user account. The predefined condition includes the origination of a call from one of a plurality of sources. Therefore, a user may have a single account for prepaying service for a plurality of origination sources.

According to another embodiment of the present invention, a plurality of user accounts may be associated with a single, predefined origination source. The user accounts include access codes. If a communications connection originates from the predefined origination source and one of the user access codes is received by the system, the system deducts the cost of the communications connection from the user account corresponding to the received user access code. Therefore, multiple users may prepay communications services for use on a single origination source. The access codes may be much shorter than access codes used by traditional calling cards because the access code need only distinguish between the relatively small number of users using the origination source.

For clarity and ease of presentation, reference is made herein to a telephone network through which telephone calls may be placed. As would be understood by one of ordinary skill in the art, the present invention may be applied to any network, for example, a wireless or wired telecommunications or computer network where users are allowed to connect to the network from various locations. Any communications connection may be substituted for a "call."

Figure 1:
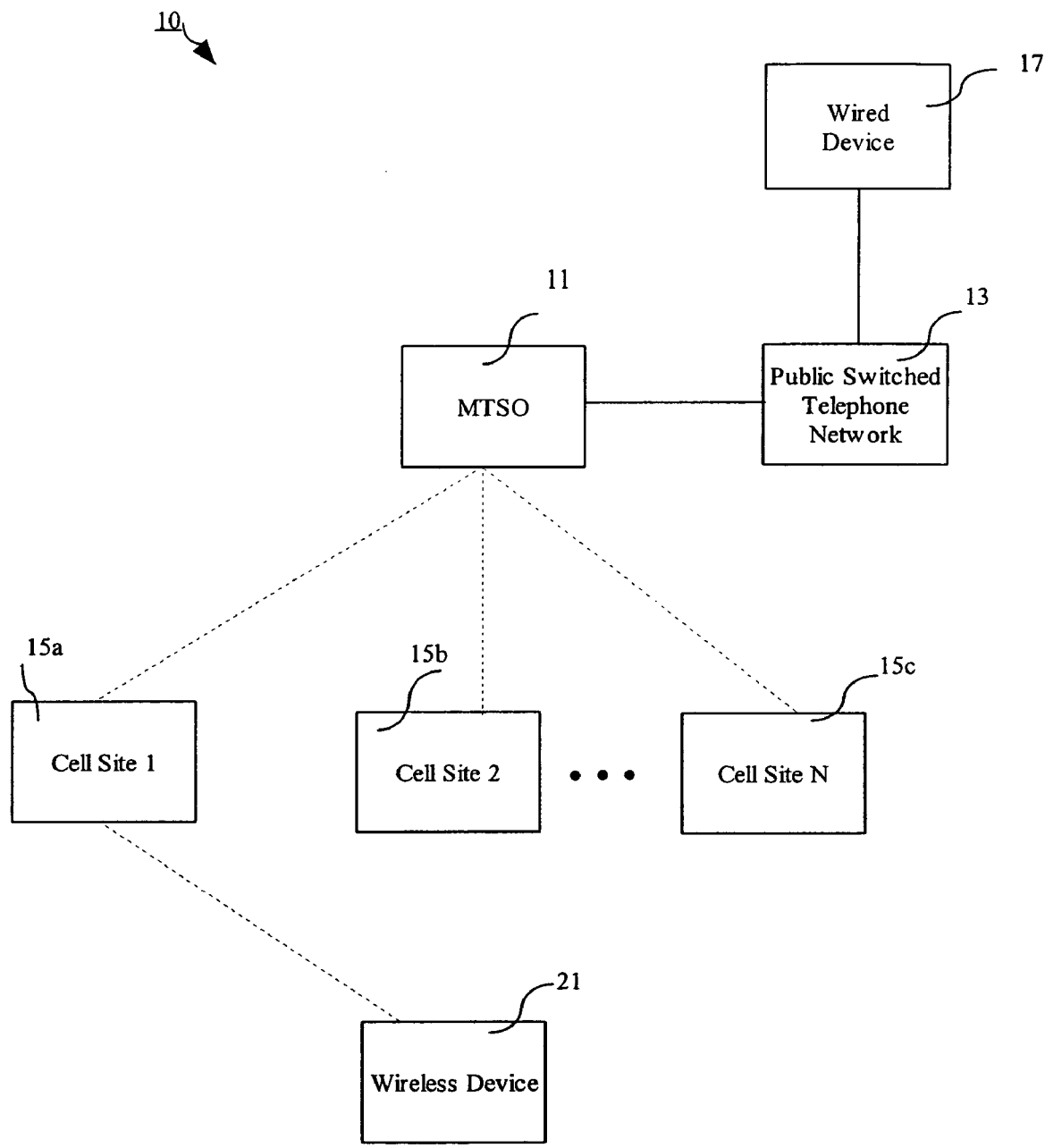
FIG. 1 is a block diagram of an exemplary telephone network.

FIG. 1 shows an exemplary telephone network. An overview of wireless telephone networks is provided in more detail in U.S. Pat. No. 5,850,606 to Bedingfield et al., which is hereby incorporated by reference.

For clarity and ease of presentation, an example of a telephone network, including both wireless and wired devices, has been depicted in FIG. 1. As will be readily appreciated by those of ordinary skill in the art, the invention is applicable to wireless, wired, and other types of communication networks. For example, the invention is easily modified for use in a computer network. Any number of network configurations may be used to implement the system and method disclosed herein. It is not necessary that a particular wireless or wired telephone or other network configuration is used.

In the network 10 depicted in FIG. 1, a mobile wireless device 21 communicates with other telephones and compatible electronic equipment through one or more mobile telephone switching offices ("MTSO") 11 and cellular sites 15a-15n. The MTSO 11 establishes voice or other communications such as text communications with other telephones and compatible electronic equipment within the coverage area. As is known to those skilled in the art, the wireless device 21 passes through various cellular sites 15a-15n under the control of the MTSO 11 based on the geographic movement of the wireless telephone user. Each cellular site 15a-15n contains a transmitter and a receiver for communicating voice and data signals directly to and from the MTSO 11 and the wireless device 21 while the wireless device 21 is within the transmission range of a particular cellular site 15a. As the wireless device 21 is moved outside the range of cellular site 15a, it is transferred to a second cellular site such as cellular site 15b. The MTSO 11 controls the wireless device 21 as it passes through the various cellular sites 15a-15n.

The MTSO 11 controls a number of cellular sites and has a geographic range for tracking and monitoring wireless telephones. The MTSO 11 depicted in the network 10 is connected to a public switched telephone network 13. A wired device 17 is connected to the public switched telephone network 13. Both the connection between the MTSO 11 and the public switched telephone network 13 may be a wired connections or may be wireless connections. The wired device 17 can be a wireless mobile telephone, or a wired telephone, or any device compatible with the telephone network such as personal computers (PC's) or other electronic devices.

Figure 2:
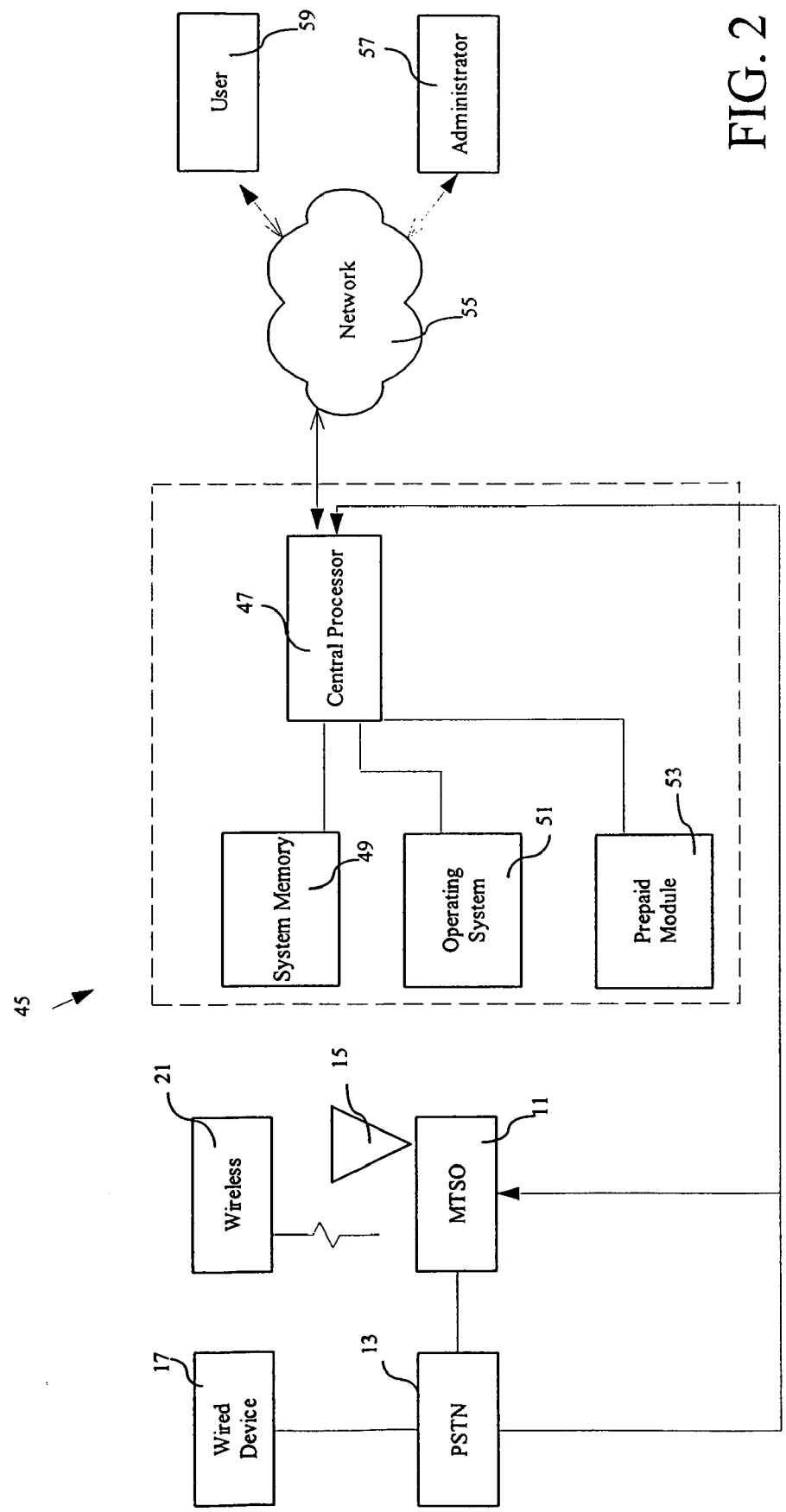
FIG. 2 is a block diagram of an exemplary computer system and telephone network for implementing the invention.

FIG. 2 is a block diagram which depicts an embodiment of a system according to the present invention. The system has a PSTN 13 that is in communication with a wired device 17, a wireless device 21, a cellular site 15, and an MTSO 11. The PSTN 13, wireless device 21, MTSO 11, wired device 17, and cellular site 15 may be part of a network of other MTSOs, wireless and wired devices, and cellular sites, such as the network shown in greater detail in FIG. 1.

The MTSO 11 is in communication with a computer system 45 through a central processor 47 that resides on the computer system 45. The computer system 45 has system memory 49 for storing data. An operating system 51 is loaded onto the computer system 45 for running and controlling application software. The prepaid module 53 is an example of an application that is run by the operating system 51. The prepaid module is a computer readable medium, such as diskette, compact disk, or hard drive. The prepaid module 53 is described in greater detail below.

The central processor 47 of the computer system 45 is also in communication with a computer network 55. The computer network 55 allows communication between the computer system 45 and other computer systems or terminals that may be connected to the computer network 55. Examples of terminals that may be connected to the computer network 55 include the user terminal 59 and the administrator terminal 57.

The system depicted in FIG. 2 allows data, such as call information, voice transmissions, and text messages, from the wireless device 21 to be transmitted from the cellular site 15 and an MTSO 11 to a computer system 45. Alternatively, data is transmitted from a wired device and PSTN 13 to the computer system 45. The data is stored in the system memory 49, and/or processed by the prepaid module 53, which is run and controlled by the operating system 51. The central processor 47 communicates the data or other information derived from the data to a computer network 55, where it may be accessed at a user terminal 59 or an administrator terminal 57. Thus, a user or administrator can track the usage of the wireless device 21 from the user terminal 59 or administrator terminal 57, respectively.

In an embodiment of a system for implementing a method according to the present invention, the prepaid module 53 comprises a software program or computer readable medium for storing and tracking the user's prepaid account. The network system depicted in FIG. 2 is an example of the environment in which the prepaid module is operated. As would be understood by one of ordinary skill in the art, alternative networks may be implemented. In an alternative embodiment, the computer system 45 and the user terminal 59 could be a single computer, which receives and processes the data (using the prepaid module 53) from the wireless device 21 or wired device 17 directly. In another embodiment, a telephone network is substituted for the computer network 55 and a telephone is substituted for the user terminal 59. The user dials a telephone number, which connects the user to a voice mail system through a telephone network. Information from the computer system 45 is communicated to the user through the voice mail system, which may be a conventional voice mail service. In yet another embodiment, the wireless device 21 contains a processor chip that runs the prepaid module 53 on the wireless telephone itself. In this embodiment, the wireless device 21 has a display through which the user can access information about calling usage processed by the prepaid module 53. Thus, the computer network 55, computer system 45 and user and administrator terminals 59 and 57 are eliminated.

Figure 3:
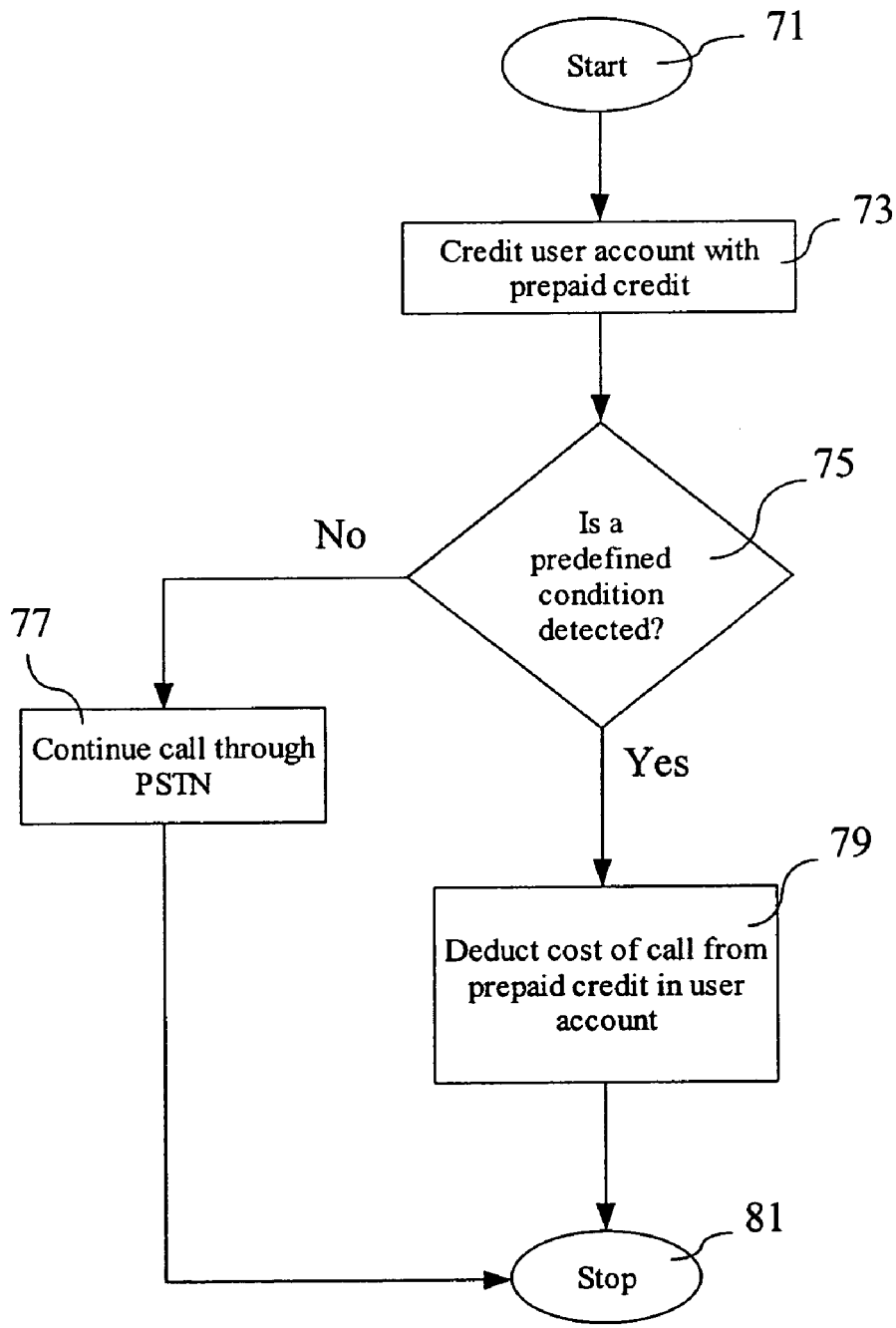
FIG. 3 shows the flow of an embodiment of a method according to the present invention.

One embodiment of the operation of the prepaid module 53 shown in FIG. 2 is depicted in FIG. 3. Referring to FIG. 3, a program routine starts at step 71 and credits a user account with prepaid credit at step 73. The prepaid credit may be entered into the prepaid module 53 as shown in FIG. 2 by the user 59 or administrator 57 through the network 55. Other methods of receiving payment for the prepaid credit are discussed in detail in co-pending application Ser. No. 10/008,511, entitled "Method and System for Paying Prepaid Communications Credit," which is incorporated herein by reference.

Referring again to FIG. 3, the prepaid module detects a call from a communications device, and detects whether a predefined condition is present in the call information at step 75. For example, if a predefined condition is detected at step 75, the cost of the call is deducted from the prepaid credit in the user account at step 79, and the program routine stops at step 81. If predefined conditions are not detected at step 75, the call is continued through the PSTN at step 77. For clarity and ease of presentation, reference is made to a PSTN. However, other alternative communications network may be substituted for the PSTN, such as a computer network. Continuation through the PSTN at step 77 includes any processing that the PSTN or other communications network ordinarily performs such as "toll blocking" calls made from call origination lines that are toll blocked. Thus, when the cost of the call is deducted from prepaid credit in a user account at step 79, a toll block may be bypassed.

The predefined condition detected by the prepaid module includes the origination of the phone call from a plurality of predefined sources. This enables two or more sources for call to be paid for from a single prepaid account. The predefined condition may also include the destination of the call, an access code, a determination that the call is a long distance call. Referring to FIG. 2, the predefined conditions may be defined in the prepaid module 53 by a user or administrator by entering the conditions through a network 55 from a user terminal 59, administrator terminal 57, wired device 17 or wireless device 21.

In one embodiment, the access code may be entered by a user by pressing a single key on the wired device 17 or wireless device 21. For example, a programmable or preprogrammed key may be included on the wired device 17 or wireless device 21. When the user presses the key before making a communications connection, the access code is transmitted to the prepaid module 53 where it is received as a predefined condition. In another embodiment, the access code may be a relatively short code, for example four or fewer digits such as "*79."

Figure 4:
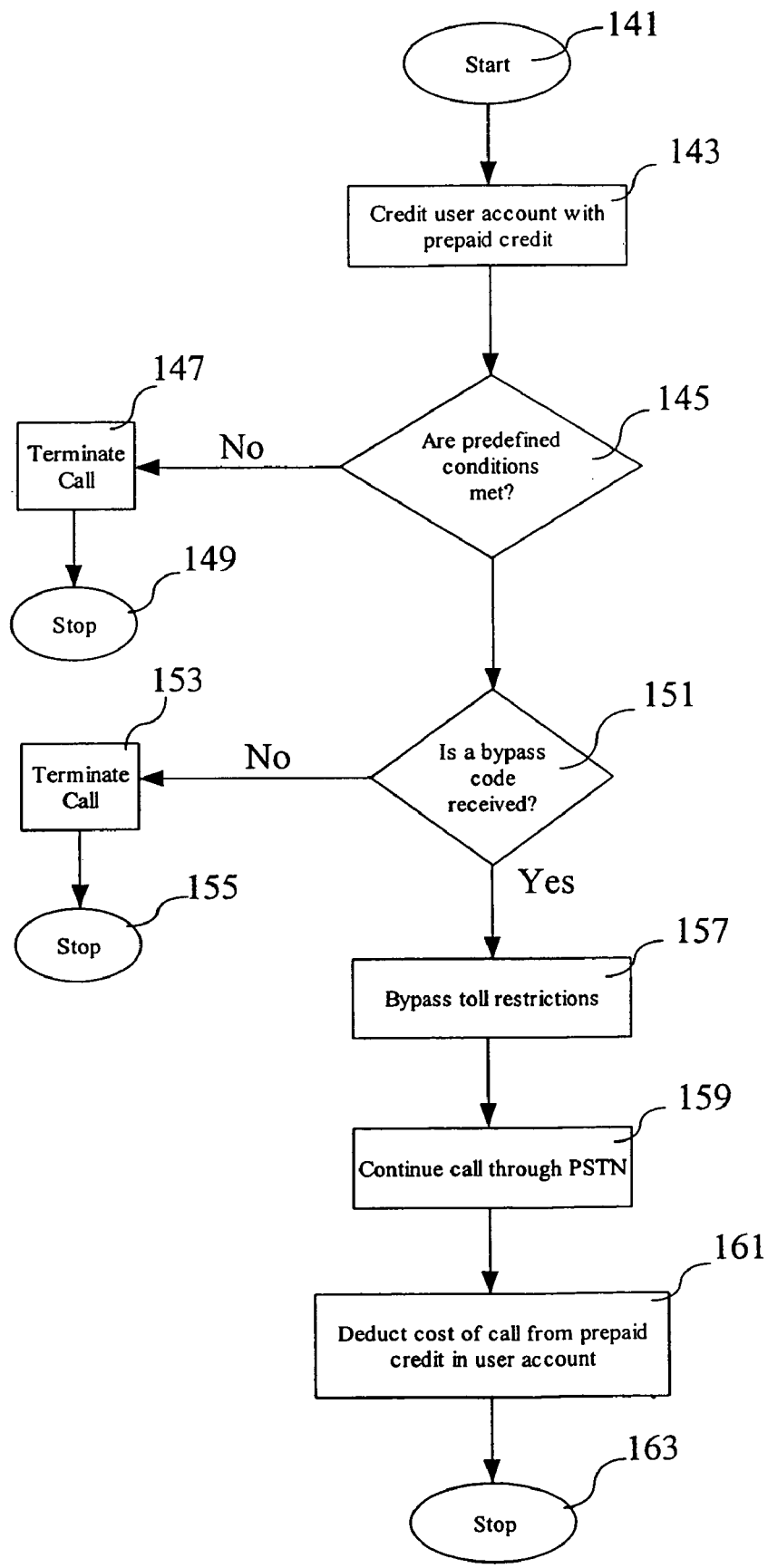
FIG. 4 shows an alternative embodiment of a method according to the present invention.

Another embodiment of the operation of the prepaid module 53 shown in FIG. 2 is depicted in FIG. 4. The prepaid module begins at step 141. The prepaid module credits a user account with prepaid credit at step 143. The prepaid module detects a predefined condition of a call and determines of the predefined condition is detected at step 145. If the predefined conditions are not met at step 145, the call is terminated at step 147 and the prepaid module stops at step 149. at step 151, the prepaid module checks whether a bypass code was received. A bypass code is a code that enables the network to bypass toll restrictions. If a bypass code is not received, the call is terminated at step 153 and the prepaid module ends at step 155.

If the bypass code is received at step 151, then toll restrictions are bypassed at step 157. The call is continued through the PSTN at step 159. The cost of the call is deducted from the prepaid credit in the user account at step 161, and the prepaid module stops at step 163.

Figure 5:
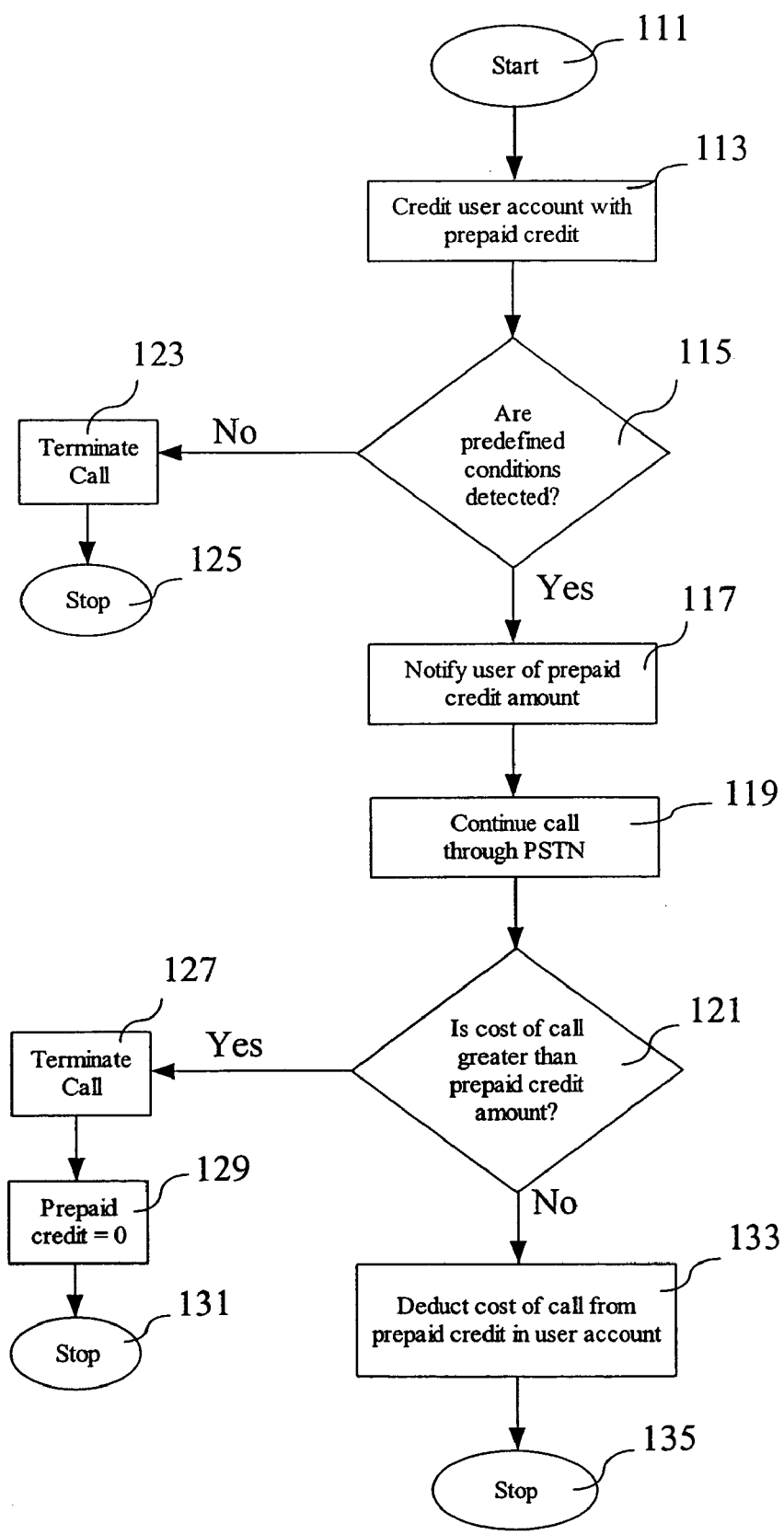
FIG. 5 shows another alternative embodiment of a method according to the present invention.

Yet another embodiment of the operation of the prepaid module 53 shown in FIG. 2 is depicted in FIG. 5. The prepaid module starts at step 111 and credits the user account with prepaid credit at step 113. For each call that is made, the prepaid module detects whether predefined conditions are present. If a predefined condition is not detected at step 115, the prepaid module terminates the call at step 123.

If a predefined condition is detected at step 115, the prepaid module notifies the user of a prepaid credit amount at step 117. This notification may occur by a recorded voice message at the beginning of the call. Alternatively, a user can check how much prepaid credit is in the user's account by accessing the prepaid module through the network 55 from the user terminal 59 depicted in FIG. 2.

Referring back to FIG. 5, the call is continued through the PSTN at step 119. During the call, the prepaid module checks whether the cost of the call is greater than the prepaid credit amount. If the cost of the call is greater than the prepaid credit amount at step 121, than the prepaid module terminates the call at step 127 and sets the prepaid credit in the account to zero at step 129. The prepaid module then ends at step 131.

If the cost of the call is not greater than the prepaid credit amount at step 121, then the prepaid module deducts the cost of the call from the prepaid credit in the user account at step 133. The prepaid module stops at step 135.

Figure 6:
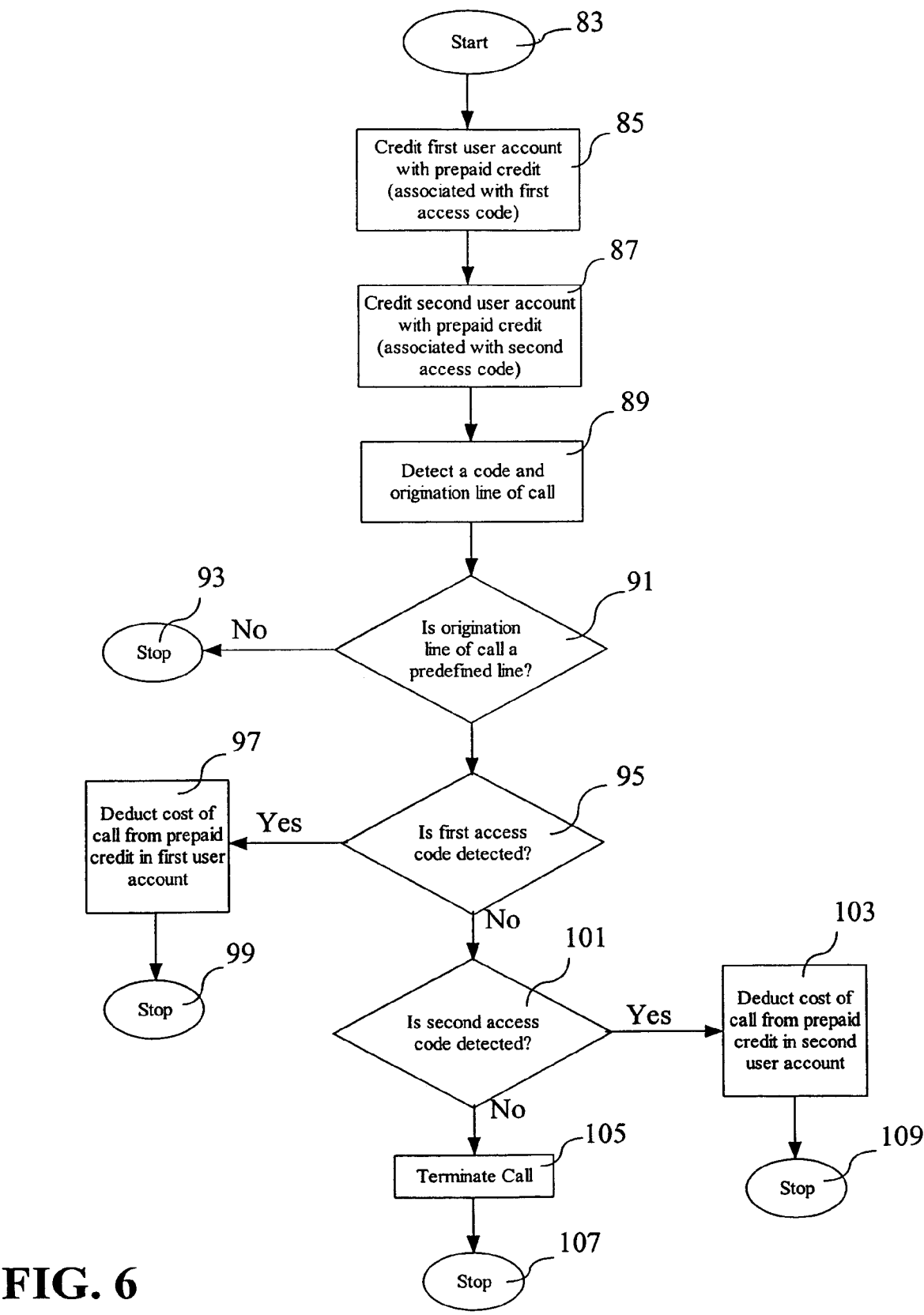
FIG. 6 shows still another alternative embodiment of a method according to the present invention.

Yet another embodiment of the operation of the prepaid module 53 shown in FIG. 2 is depicted in FIG. 6. The prepaid module starts at step 83 and credits a first user account with prepaid credit at step 85. The first user account includes a first access code associated therewith. The prepaid module then credits a second user account with prepaid credit at step 87. The second user account includes a second access code associated therewith.

The prepaid module then detects a code and an origination line of a call at step 89. If the origination line is not a predefined line at step 91, then the prepaid module stops at step 93 and the call is processed through the normal PSTN. If the first access code is detected at step 95, the prepaid module deducts the cost of the call from the prepaid credit in the first user account at step 97. The prepaid module stops at step 99. If the first access code is not detected at step 95, then the prepaid module checks whether the second access code is detected at step 101. If the second access code is detected at step 101, then the prepaid module deducts the cost of the call from the prepaid credit in the second user account at step 103, and stops at step 107. If the second access code is not detected at step 101, the prepaid module terminates the call at step 105 and stops at step 107.

EXAMPLE 1

The invention will be further illustrated by the following example. In the example, referring to FIG. 2, the user communicates with the prepaid module 53 from a user terminal 59 through a network 55 and central processor 47, as shown in FIG. 2. The user requests a prepaid credit of $30.00, and as further described below, makes two long distance "toll" calls that costs $10 each. The payment may be made, for example, by entering a credit card number into the user terminal 59. The user in this particular example has a child in college for whom the user would like to purchase phone time to call home on the user's account. Therefore, the user also requests a predefined condition that includes the user's phone number and the child's phone number as the source of the call. In other words, the account cannot be used unless the phone number from which the call is made is the user's phone number or the child's phone number. The user also requests a predefined condition that requires that when the child's phone number is the source of a call, the destination number must be the user's phone number. This predefined condition ensures that the child may only user the prepaid credits to call the user.

Referring to FIG. 3, the prepaid module starts at step 71. At step 73, the prepaid module credits the user account with the $30.00 of prepaid credit. The user makes a call from the user's phone number to a phone number in France, which costs $10.00. At step 75, the prepaid module checks the call for predefined conditions and determines that one of the predefined conditions is detected. As discussed above, one of the predefined conditions is that the source of the phone call is from the user's phone number. If the source of the phone call is the user's phone number, there is no further condition on the destination of the call. Therefore, the prepaid module deducts the cost of the call ($10.00) from the user's account, which had a $30.00 prepaid credit, at step 79. After the prepaid module deducts the cost of the call at step 79, there is $20.00 in the user's account, and the prepaid module stops at step 81.

Referring again to FIG. 3, steps 75, 77, 79 and 81 may be repeated for future calls. In a second call, the user's child makes a $10.00 phone call from the child's phone number to the user's phone. The prepaid module checks the call for a predefined condition at step 75, and determines that a predefined condition has been detected. The predefined condition detected is that the source of the phone call is from the child's phone number and the destination of the call is the user's phone number. The prepaid module deducts the cost of the call ($10.00) from the user's account, which previously had a balance of $20.00. After the cost of the call is deducted at step 79, there is $10.00 in the account.

Example 1 illustrates a user who prepays communications credit for use from two locations: the user's phone and the user's child's phone. Neither the user nor the user's child must enter a code or dial a separate toll free number to access the account, as is generally required when a prepaid calling card is used. The user also places a predefined condition on calls from the child's phone that requires the destination of the call to be the user's phone in order to be paid with the prepaid credit. If the child called a long distance "toll" number that was not the user's number, the predefined condition is not detected at step 75, and the call is continued through the PSTN at step 77. Continuation of the call through the PSTN at step 77 may include charging a call to the child's usual telephone account, or if the child's phone is "toll blocked," not allowing the call to be connected.

EXAMPLE 2

The invention will be further illustrated by the following example. In the example, a first user and a second user live at the same residence and desire to prepay for communications services from separate account using the same phone number. The first user and the second user communicate with the prepaid module 53 from a user terminal 59 through a network 55 and central processor 47, as shown in FIG. 2. The first user requests a prepaid credit of $30.00, and as further described below, makes a long distance "toll" calls that costs $10. The second user requests a prepaid credit of $50.00 and makes a long distance "toll" call that costs $20.00. The payments for the requested prepaid credit may be made, for example, with a credit card. The prepaid module sends a first access code to the first user at user terminal 59 and a second access code to the second user at user terminal 59. Preferably, the first and second user receive access codes separately such that neither the first or the second user has knowledge of the other user's access code. Each user also requests a predefined condition that includes the users' shared phone number as the source of the call. In other words, the account cannot be used unless the phone number from which the call is made is the users' shared phone number.

Referring to FIG. 6, the prepaid module starts at step 83 and credits the first user account with the requested $30.00, and the first user account is associated with the first access code. The prepaid module credits the second user account with $50.00, and the second user account is associated with a second access code.

The first user makes a $10.00 call from the shared phone number and enters the first user code. The prepaid module detects a code and the origination line of a call at step 89. At step 91, the prepaid module determines that the origination of the call is the shared phone number specified by the users. At step 95, the prepaid module determines whether the first access code is detected. Because the first access code was entered, the prepaid module deducts the cost of the call ($10.00) from the prepaid credit in the first user account ($30.00). The first user account is left with $20.00 for future calls, and the prepaid module stops at step 99.

Steps 89, 91, 93, 95, 97, 99, 101, 103, 105, 107, and 109 may be repeated for future calls. In Example 2, the second user makes a call that costs $20.00 from the users' shared phone number and enters the second user's access code. At step 89, the prepaid module detects the code and origination line of the call. At step 91, the prepaid module determines that the origination of the call is the shared phone number specified by the users. At step 95, the prepaid module determines whether the first access code is detected. Because the first access code was not entered, the prepaid module determines whether the second access code is detected at step 101. Because the second user entered the second access code, the second access code is detected at step 101, and the prepaid module deducts the cost of the call ($20.00) from the prepaid credit in the second user account ($50.00). The second user account is left with $30.00 of prepaid credit remaining, and the prepaid module stops at step 109.

Example 2 illustrates two users who share the same phone line who prepay communications credits to two separate user accounts. Lengthy access codes are not required because the code need only distinguish between two users. Therefore, in Example 2, the first access code and the second access code may be as short as a single digit. In contrast, prepaid calling cards typically require lengthy access codes because the origination of the call is never examined, and thus the account must be distinguished from all accounts serviced by a communications service provider.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

That which is claimed:

1. A method for managing a communications connection, comprising:
    receiving a predefined condition, wherein the predefined condition comprises a plurality of origination numbers and a plurality of destination numbers;
    determining if an origination number of a communications connection is an origination number of the predefined condition and if a destination number of the communications connection is a destination number of the predefined condition; and
    if the origination number of the communications connection is the origination number of the predefined condition and if the destination number of the communications connection is the destination number of the predefined condition, then deducting the cost of the communications connection from a user account.

2. The method of claim 1, wherein the communications connection comprises at least one of a phone, a handheld device, or a personal computer.

3. The method of claim 1, wherein the communications connection comprises a broadband connection.

4. The method of claim 1, wherein the communications connection comprises an Ethernet connection.

5. The method of claim 1, further comprising notifying a user of an amount of credit in the user account.

6. The method of claim 1, further comprising bypassing toll restrictions if a bypass code is received.

7. The method of claim 1, further comprising accepting a code number to access the user account.

8. The method of claim 1, further comprising terminating the communications connection if the predefined condition is not met.

9. A computer-readable medium having stored thereon computer-executable instructions which when executed by a computer perform a method for managing a communications connection, the method comprising:
    receiving a predefined condition, wherein the predefined condition comprises an origination number and a destination number;
    determining if an origination number of a communications connection is the origination number of the predefined condition and if a destination number of the communications connection is the destination number of the predefined condition; and
    if the origination number of the communications connection is the origination number of the predefined condition and if the destination number of the communications connection is the destination number of the predefined condition, then deducting the cost of the communications connection from a user account.

10. The computer-readable medium of claim 9, wherein the communications connection comprises a phone call.

11. The computer-readable medium of claim 9, wherein the communications connection comprises a digital subscription line ("DSL").

12. The computer-readable medium of claim 9, wherein the communications connection comprises an Ethernet connection.

13. The computer-readable medium of claim 9, further comprising notifying a user of an amount of credit in the user account.

14. The computer-readable medium of claim 9, further comprising bypassing toll restrictions if a bypass code is received.

15. The computer-readable medium of claim 9, further comprising accepting a code number to access the user account.

16. The computer-readable medium of claim 9, further comprising terminating the communications connection if the predefined condition is not met.

17. A system for managing a communications connection, comprising:
    means for receiving a predefined condition, wherein the predefined condition comprises an origination number and a destination number;
    means for determining if an origination number of a received communications connection is the origination number of the predefined condition and if a destination number of the received communications connection is the destination number of the predefined condition; and
    means for deducting the cost of the communications connection from the user account in response to a determination that the origination number of the received communications connection is the origination number of the predefined condition and that the destination number of the received communications connection the destination number of the predefined condition.

18. The system of claim 17, wherein the communications connection comprises a phone call.

19. The system of claim 17, wherein the communications connection comprises a digital subscription line ("DSL").

20. The system of claim 17, wherein the communications connection comprises an Ethernet connection.

* * * * *